United States Patent
Favela Tentori et al.

(10) Patent No.: US 11,639,097 B2
(45) Date of Patent: May 2, 2023

(54) THERMAL MANAGEMENT SYSTEM FOR A VEHICLE

(71) Applicant: Honda Motor Co., Ltd., Tokyo (JP)

(72) Inventors: Daniel A. Favela Tentori, Columbus, OH (US); Christopher E. Lang, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 17/094,009

(22) Filed: Nov. 10, 2020

(65) Prior Publication Data

US 2021/0402869 A1 Dec. 30, 2021

Related U.S. Application Data

(63) Continuation-in-part of application No. 16/910,680, filed on Jun. 24, 2020.

(51) Int. Cl.
*B60K 11/04* (2006.01)
*B60L 58/26* (2019.01)
(Continued)

(52) U.S. Cl.
CPC ............. *B60K 11/04* (2013.01); *B60K 11/02* (2013.01); *B60L 1/02* (2013.01); *B60L 58/26* (2019.02);
(Continued)

(58) Field of Classification Search
CPC .......... B60K 11/04; B60K 11/02; B60K 1/00; B60K 11/085; B60K 2001/003;
(Continued)

(56) References Cited

U.S. PATENT DOCUMENTS 4,280,330 A * 7/1981 Harris ................ G05D 23/1919
307/64
6,357,541 B1 * 3/2002 Matsuda ................ B60K 11/02
903/905
(Continued)

FOREIGN PATENT DOCUMENTS

DE         2931812 A1    2/1981
DE   102004010632 A1   10/2005
(Continued)

OTHER PUBLICATIONS

Espacenet Machine Translation of DE Patent No. 102016120459 A1.
(Continued)

*Primary Examiner* — Ljiljana V. Ciric
(74) *Attorney, Agent, or Firm* — Plumsea Law Group, LLC

(57) ABSTRACT

A thermal management system having a first mode of operation configured to transfer heat from a first plurality of components of a vehicle in the first fluid flow path and to selectively transfer heat to at least one of a second plurality of components in a second fluid flow path; a second mode of operation configured to transfer heat from the first plurality of components in the first fluid flow path and selectively transfer heat from the second plurality of components in an alternative second fluid flow path; and a third mode of operation configured to transfer heat from both the first plurality and the second plurality of components of the vehicle in a third fluid flow path. A controller is operable to selectively change the mode of operation between the first mode of operation, the second mode of operation and the third mode of operation based on operating conditions of the vehicle.

9 Claims, 10 Drawing Sheets

(51) Int. Cl.
  *B60K 11/02* (2006.01)
  *B60L 1/02* (2006.01)
  *B60L 58/27* (2019.01)
  *B60K 1/00* (2006.01)
  *B60K 11/08* (2006.01)

(52) U.S. Cl.
  CPC ............... *B60L 58/27* (2019.02); *B60K 1/00* (2013.01); *B60K 11/085* (2013.01); *B60K 2001/003* (2013.01); *B60K 2001/005* (2013.01); *B60K 2001/006* (2013.01); *Y02T 10/70* (2013.01); *Y02T 10/88* (2013.01)

(58) Field of Classification Search
  CPC ........ B60K 2001/005; B60K 2001/006; B60L 1/02; B60L 58/26; B60L 58/27; Y02T 10/70; Y02T 10/88
  See application file for complete search history.

(56) References Cited

U.S. PATENT DOCUMENTS

| | | | |
|---|---|---|---|
| 6,394,207 B1 * | 5/2002 | Skala | H01M 8/04029 429/437 |
| 6,443,253 B1 | 9/2002 | Whitehead et al. | |
| 6,505,696 B1 | 1/2003 | Prevost | |
| 7,150,159 B1 * | 12/2006 | Brummett | B60H 1/3226 62/239 |
| 7,451,808 B2 * | 11/2008 | Busse | F01P 3/20 62/238.7 |
| 7,789,176 B2 * | 9/2010 | Zhou | B60L 58/26 180/65.1 |
| 8,402,776 B2 * | 3/2013 | Johnston | B60L 58/26 62/79 |
| 8,448,696 B2 * | 5/2013 | Johnston | B60L 58/26 165/917 |
| 9,776,499 B2 | 10/2017 | Nam et al. | |
| 9,926,022 B1 | 3/2018 | Golembeski et al. | |
| 10,252,597 B2 * | 4/2019 | Wallace | B60L 58/27 |
| 11,207,939 B2 * | 12/2021 | Johnston | B60H 1/00885 |
| 11,456,497 B2 * | 9/2022 | Mackenzie | H01M 10/486 |
| 11,515,586 B2 * | 11/2022 | Guerra | H01M 10/625 |
| 11,518,272 B2 * | 12/2022 | Soh | H01M 10/625 |
| 2004/0194912 A1 | 10/2004 | Honda | |
| 2012/0216562 A1 * | 8/2012 | Kadle | F28D 9/0093 62/434 |
| 2014/0012447 A1 * | 1/2014 | Gao | B60L 58/13 701/22 |
| 2015/0217623 A1 * | 8/2015 | Hatakeyama | B60L 1/02 429/62 |
| 2015/0258875 A1 * | 9/2015 | Enomoto | B60L 58/24 165/104.31 |
| 2016/0248129 A1 * | 8/2016 | Dunham | H01M 10/63 |
| 2017/0087957 A1 * | 3/2017 | Blatchley | B60H 1/321 |
| 2017/0158081 A1 * | 6/2017 | Kim | H01M 10/6568 |
| 2018/0163607 A1 | 6/2018 | Uto et al. | |
| 2018/0361828 A1 * | 12/2018 | Kato | F25B 6/04 |
| 2019/0176578 A1 * | 6/2019 | Blatchley | B60H 1/323 |
| 2020/0324611 A1 * | 10/2020 | Yano | B60H 1/00278 |
| 2020/0353790 A1 * | 11/2020 | Miyoshi | B60H 1/143 |
| 2021/0291628 A1 * | 9/2021 | Kinoshita | B60H 1/00385 |
| 2021/0402869 A1 * | 12/2021 | Favela Tentori | B60L 1/02 |
| 2022/0069387 A1 * | 3/2022 | Maeda | B60H 1/00885 |
| 2022/0134905 A1 * | 5/2022 | Cox | H01M 10/6563 429/71 |

FOREIGN PATENT DOCUMENTS

| | | | | |
|---|---|---|---|---|
| DE | 102004019769 A1 | 11/2005 | | |
| DE | 102015103393 A1 | 9/2016 | | |
| DE | 102016120459 A1 | 4/2018 | | |
| DE | 102017200624 A1 | 7/2018 | | |
| DE | 102019207203 A1 * | 6/2020 | ......... | B60H 1/00278 |
| JP | 2005126029 A | 5/2005 | | |
| JP | 2010274675 A | 12/2010 | | |
| JP | 6002000 B2 | 10/2016 | | |
| WO | WO-2008127527 A1 * | 10/2008 | ......... | B60H 1/00278 |

OTHER PUBLICATIONS

Espacenet Machine Translation of DE Patent No. 102015103393 A1.

Espacenet Machine Translation of DE Patent No. 102004010632 A1.

Espacenet Machine Translation of JP Patent No. 6002000 B2.

* cited by examiner

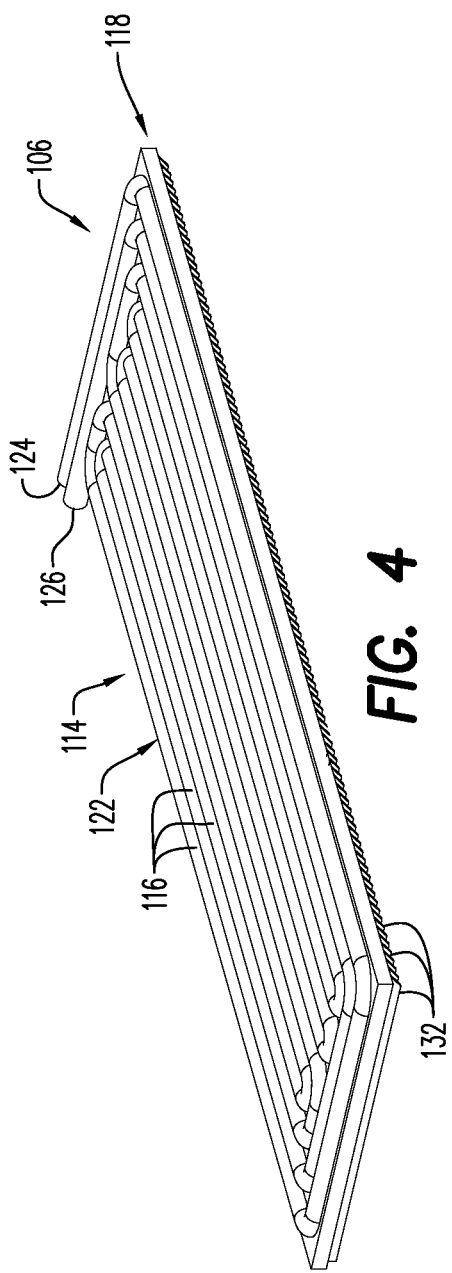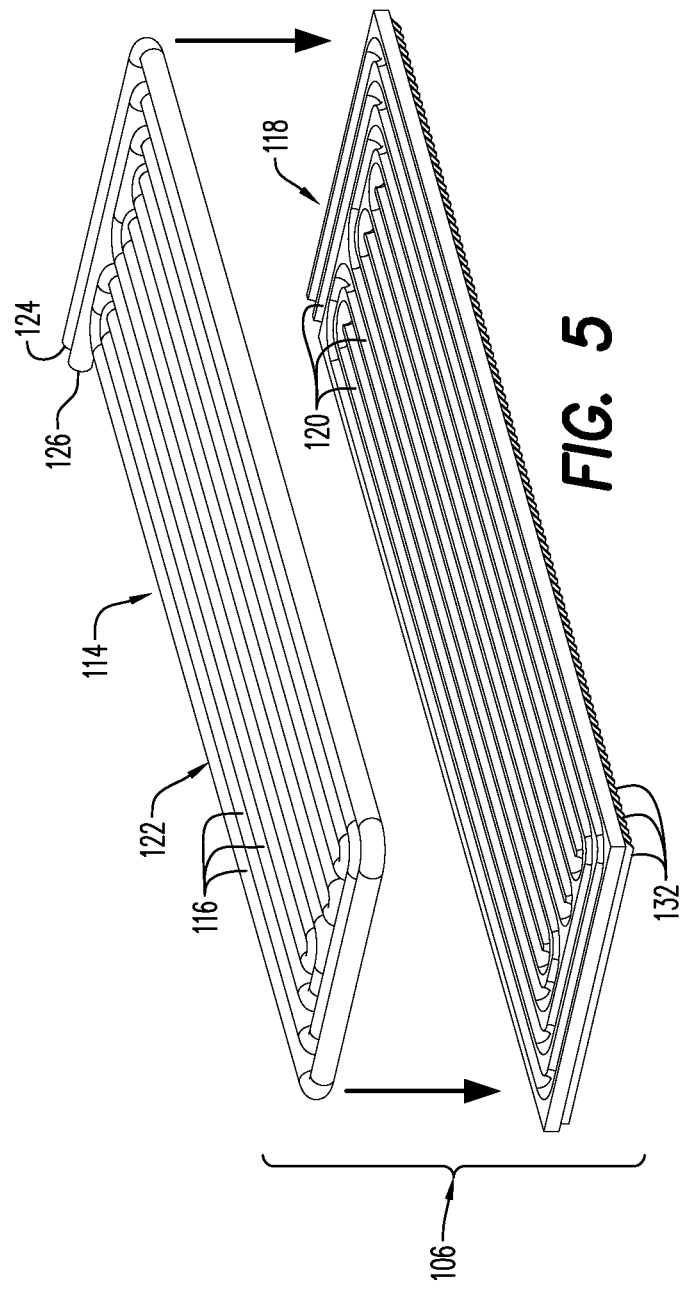

THERMAL MANAGEMENT SYSTEM FOR A VEHICLE

CROSS-REFERENCE TO RELATED APPLICATION

This application is a continuation-in-part of co-pending application Ser. No. 16/910,680, filed Jun. 24, 2020, the disclosure of which is hereby incorporated by reference.

BACKGROUND

1. Field of the Disclosure

The present disclosure relates to a thermal management system for heating or cooling vehicle components, and more particularly, to a thermal management system including a five-way valve.

2. Description of Related Art

In a vehicle, such as an electric vehicle, with a conventionally disposed heat exchanger in the front end structure, i.e., under the hood, ambient air generally flows through a front vehicle grille and then through the heat exchanger. The heat exchanger transfers heat from the hot coolant that flows in the heat exchanger tubes to the cooler ambient air blowing through it, thereby providing heat transfer for cooling selected components of the vehicle. While effective for cooling purposes, cross airflow through the heat exchanger creates an aerodynamic drag that can diminish the overall performance of the vehicle. Active grille shutters can be used to regulate the airflow to the heat exchanger to reduce aerodynamic drag and improve fuel economy. Airflow through the heat exchanger is decreased when the active grille shutters are closed and thus the cooling ability of the cooling system is reduced.

Thus, as new vehicle powertrains develop, new concepts are used for cooling and heating the powertrain, and with the new cooling and heating concepts, it is desirable to optimize the cooling and heating circuit by reducing the number of components in the circuit.

SUMMARY

The disclosure herein provides a heat transfer system for a vehicle, and in a non-limiting example, for an electric vehicle. Electric vehicles utilize multiple systems including batteries, chargers, and other components that do not operate as efficiently if the temperature of the component is not within a specific predetermined range. While conventional cooling systems provide cooling to a certain degree, the systems require a large number of components and the installations do not readily adapt when operating conditions may require further cooling or heating of the battery in order to obtain improved performance and vehicle efficiency. An exemplary embodiment of the disclosure maximizes the versatility of a thermal management system utilizing a minimal number of components and is adapted to switch between various modes of operation in order to provide the necessary cooling or heating to the battery.

In one aspect, the disclosure provides a heat transfer system for a vehicle having a first mode of operation wherein a heat exchanger is configured to cool a first plurality of components of a vehicle in a first fluid flow path, and a battery heat exchanger is configured to heat at least one battery in a second fluid flow path, wherein the first fluid flow path is separate from the second fluid flow path; a second mode of operation wherein the heat exchanger is configured to cool the first plurality of components in the first fluid flow path and a chiller is configured to selectively cool a second plurality of components of the vehicle in the second fluid flow path; and a third mode of operation wherein the heat exchanger is configured to cool both the first plurality of components and the second plurality of components in a third fluid flow path. A controller is operable to selectively change a mode of operation between the first mode of operation, the second mode of operation and the third mode of operation based on one or more operating conditions of the vehicle.

In another aspect, the disclosure provides a thermal management system for a vehicle having a first mode of operation configured to transfer heat from a first plurality of components of a vehicle in a first fluid flow path and to selectively transfer heat to at least one of a second plurality of components of a vehicle in a second fluid flow path; a second mode of operation configured to transfer heat from the first plurality of components in the first fluid flow path and selectively transfer heat from the second plurality of components in an alternative second fluid flow path, wherein the alternative second fluid flow path is separate and distinct from the first fluid flow path; and a third mode of operation configured to transfer heat from both the first plurality of components and the second plurality of components in a third fluid flow path. A controller is operable to selectively change a mode of operation between the first mode of operation, the second mode of operation and the third mode of operation based on one or more operating conditions of the vehicle.

A further aspect of the disclosure provides a method for transferring heat in a vehicle including providing a control system for selectively changing a mode of operation of a heat transfer system between operating in a first mode of operation, operating in a second mode of operation and operating in a third mode of operation based on one or more operating conditions of the vehicle; wherein operating in the first mode of operation includes transferring heat from a first plurality of vehicle components with a working fluid in a first fluid flow path and transferring heat to/from a second plurality of vehicle components with the working fluid in a second fluid flow path, the first fluid flow path and the second fluid flow path being separate and distinct; wherein operating in the second mode of operation includes transferring heat from the first plurality of vehicle components with the working fluid in the first fluid flow path and transferring heat from the second plurality of vehicle components with the working fluid in an alternative second fluid flow path, the first fluid flow path and the alternative second fluid flow path being separate and distinct; and wherein operating in the third mode of operation includes transferring heat from the first plurality of vehicle components and the second plurality of vehicle components with the working fluid in a third fluid flow path.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 4 is a front perspective view of the surface heat exchanger according to an exemplary embodiment of the disclosure.

FIG. 5 is an exploded view of the surface heat exchanger shown in FIG. 4.

DETAILED DESCRIPTION

An exemplary embodiment of the disclosure provides a thermal management system able to control the circulation of the working fluid through alternative flow paths based upon a number of vehicle operating conditions. The thermal management system reduces the overall weight of the required components in addition to providing a cost savings due to the reduction in the number of components. Still further, since there are fewer required components to be installed in the given engine space, the thermal management system provides for a better installation of the overall assembly with improved serviceability and layout of surrounding parts.

Under certain predetermined driving conditions, a thermal management control system may redirect coolant flow to utilize a heat exchanger to produce sufficient heat transfer, such as cooling, for a selected vehicle component. The thermal management control system also provides for utilization of both the heat exchanger and a chiller under certain predetermined conditions or the use of the heat exchanger to produce sufficient heat transfer for a selected vehicle component and a battery heat exchanger if conditions dictate to transfer heat to the battery to maintain optimum performance.

Figure 1A:
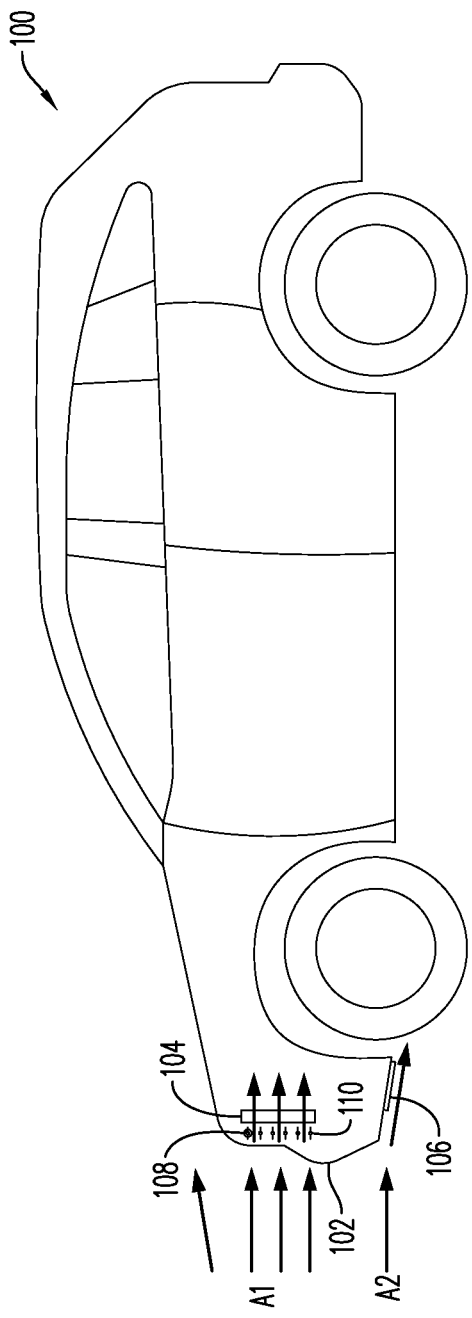
FIG. 1A is a schematic view of a heat transfer system in a first mode of operation according to an exemplary embodiment of the disclosure.
Figure 1B:
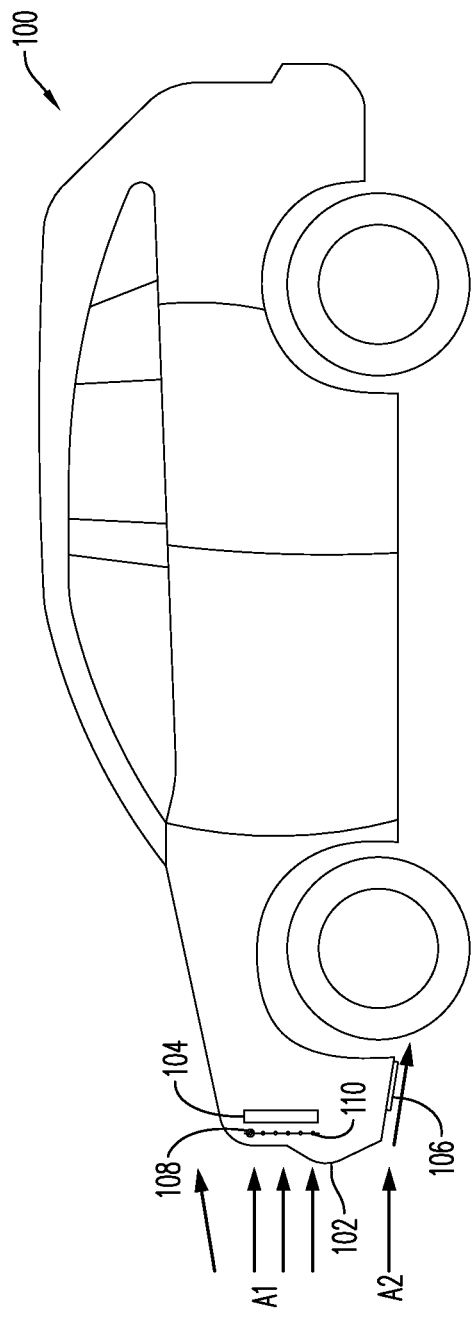
FIG. 1B is a schematic view of the heat transfer system in a second mode of operation according to an exemplary embodiment of the disclosure.

With reference to FIGS. 1A and 1B, a vehicle in accordance with an exemplary embodiment of the disclosure is shown generally by reference numeral 100. The vehicle 100 has a front structure 102, and a heat transfer system including a first heat exchanger or flow through heat exchanger 104, a second surface heat exchanger or surface heat exchanger 106, and a heat transfer fluid flow circuit (as discussed below). Although the first heat exchanger is also referred to as the flow through radiator or flow through heat exchanger 104, it is not limited to the functionality of a conventional flow through radiator, as it may be used for different heating or cooling purposes in one or more modes of operation. Although the second surface heat exchanger is also referred to as the surface radiator or surface heat exchanger 106, it is not limited to the functionality of a conventional radiator. For example, it is possible that in one or more modes of operation, the surface heat exchanger 106 may function as a condenser in a cooling circuit, or an evaporator in a heating circuit. Although the first heat exchanger is also referred to herein as the primary heat exchanger and the second surface heat exchanger is also referred to herein as the secondary heat exchanger, such designations are not limiting as it is to be understood that the second surface heat exchanger may operate as the primary heat exchanger for the vehicle component under certain conditions.

As understood by one skilled in the art, the front structure of the vehicle 102 is configured to face oncoming or incident ambient airflow A1 and A2, such as when the vehicle is in forward motion. The front structure of the vehicle 102, typically a front bumper, has openings such as a grille to allow flow to heat exchanger 104.

In the exemplary embodiment, vehicle 100 further includes an air flow control unit 108, such as grille shutters, arranged in front of the first heat exchanger 104, with regards to the forward travelling direction of the vehicle 100, to control the air flow A1 to the heat exchanger 104. With reference to FIG. 1A, the air flow control unit 108 is shown in a first manner of operation whereby the airflow control unit 108 is open and directs exterior ambient air A1 entering through front grille openings on the front of the vehicle to flow through the first or flow through heat exchanger 104 in a crossflow or substantially perpendicular manner. Although the airflow is shown as flowing through the heat exchanger 104 in a substantially perpendicular manner, it is to be understood that the air flow through the heat exchanger 104 is not limited to such a configuration. The air flow control unit 108 may also be closed in a second manner of operation to prevent the air flow A1 from reaching the first heat exchanger 104. In order to accomplish the second manner of operation, the air flow control unit 108 may include shutters or flaps 110, or any other type of known movable control valve, arranged to redirect or block the airflow A1 and prevent the airflow A1 from passing through the first heat exchanger 104, as illustrated in FIG. 1B.

Figure 2:
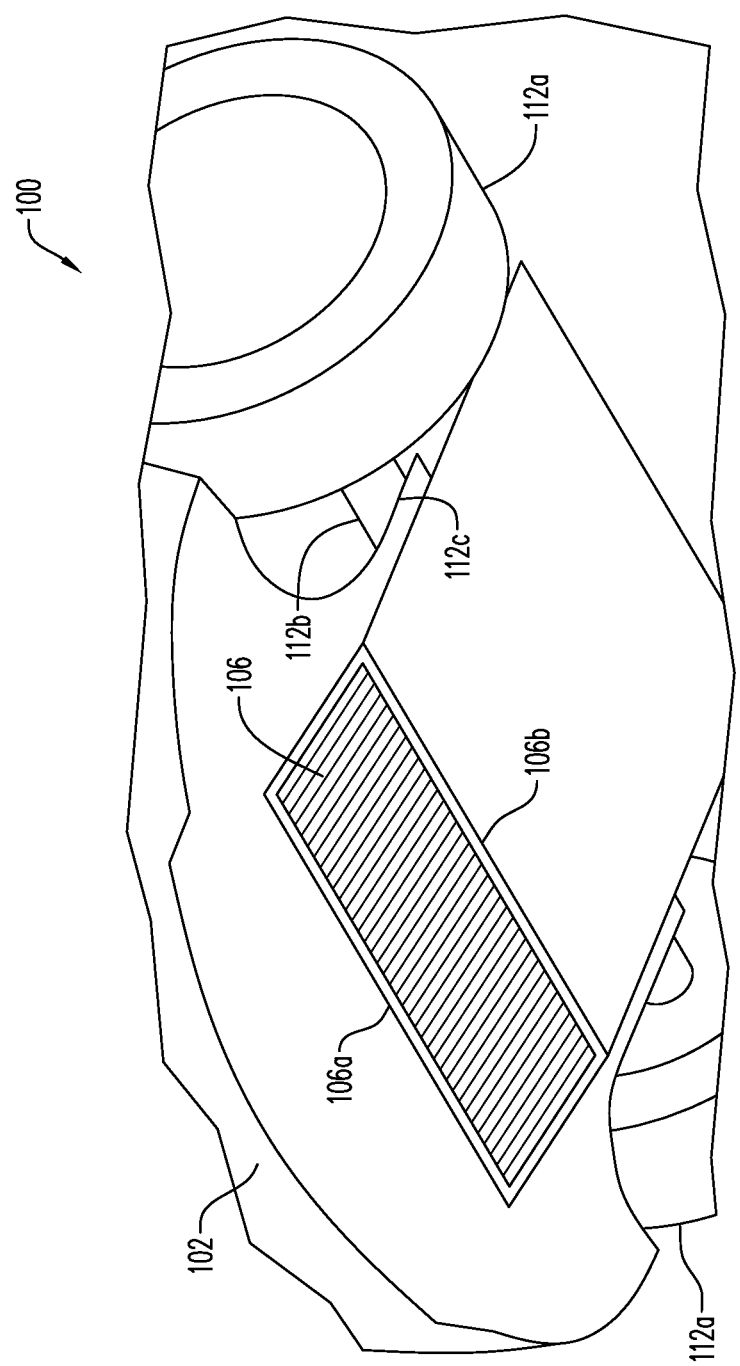
FIG. 2 is a schematic view of a surface heat exchanger positioned on a vehicle according to an exemplary embodiment of the disclosure.

With reference to FIG. 1B, the ambient air flow represented by arrows A2 passes over the second or surface heat exchanger 106, as shown disposed on the underside of the vehicle 100. Unlike the flow through heat exchanger 104 which has air flow A1 passing through the heat exchanger in a cross flow direction, i.e., substantially perpendicular to the heat exchanger, so as to create aerodynamic drag, airflow A2 merely passes over the exterior surface of surface heat exchanger 106 in a substantially parallel direction to heat exchanger 106. FIG. 2 illustrates an enlarged view showing the surface heat exchanger 106 arranged at an inclination on the front of the vehicle 102 forward of a front axle 112b, and extending in width between the front tires 112a. Heat exchanger 106 has a forward or first end 106a and a rearward or second end 106b. Air flow A2 passes under the front structure 102 of the vehicle 100 when the vehicle 100 is moving in a forward direction and will be directed under the vehicle 100, over heat exchanger 106 as the air flow A2 continues to pass under the length of the vehicle 100.

Figure 3:
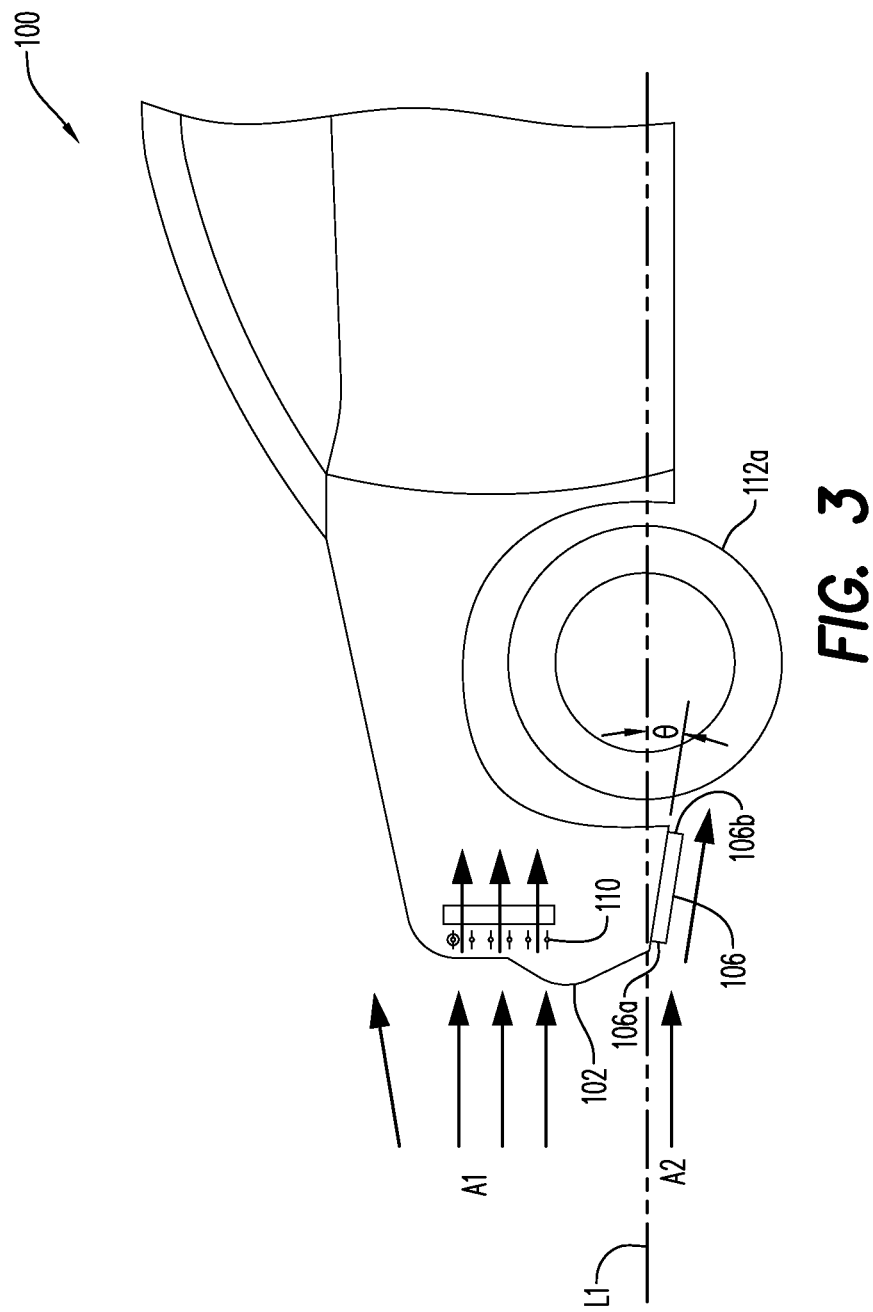
FIG. 3 is an enlarged schematic view of the surface heat exchanger positioned on the vehicle as shown in FIG. 2.
Figure 6:
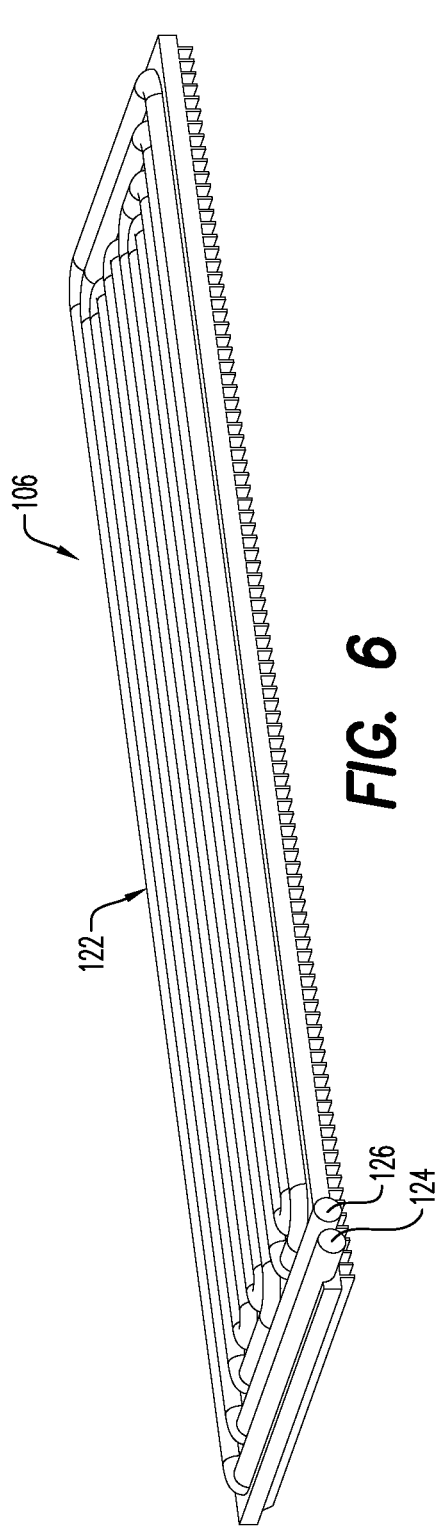
FIG. 6 is a rear perspective view of the surface heat exchanger shown in FIG. 4.
Figure 7:
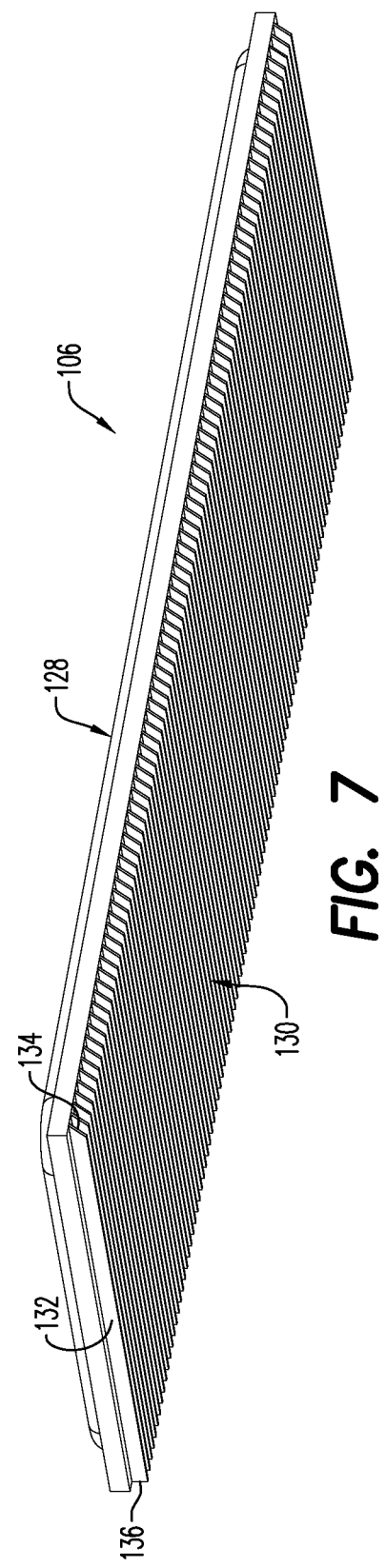
FIG. 7 is a bottom perspective view of the surface heat exchanger shown in FIG. 4.

The specific location and size of the surface heat exchanger 106 are not absolute, as long as there is a sufficient volume of air flow A2 passing over the surface of the heat exchanger 106 in a generally parallel manner to achieve the required heat transfer, i.e., heating or cooling. In accordance with an exemplary embodiment, when the surface heat exchanger 106 is disposed on the front underside of the vehicle 100 (i.e., forward of a front axle 112b between front wheel wells 112c), the surface heat exchanger 106 is also disposed at an angle relative to a longitudinal axis of the vehicle 100. That is, as shown in FIG. 3, an imaginary line L1 is shown extending parallel to the longitudinal axis of the vehicle 100 and intersecting the forward end 106a of the heat exchanger 106. The second end 106b of the heat exchanger is disposed at an angle θ relative to line L1. In the exemplary embodiment, the vehicle 100 has a predetermined height extending from the ground surface upwards to the roof of the vehicle. Hence, due to the angle of inclination at which the heat exchanger 106 is disposed, the first end 106a is positioned higher on the vehicle than the second end 106b. Further, in the exemplary embodiment, the angle θ of inclination is generally greater than 0 degrees and less than 50 degrees, and optionally greater than 0 degrees and less than 20 degrees, and optionally greater than 3 degrees and less than 12 degrees.

Because the specific location and size of the surface heat exchanger are not absolute and the disclosure herein is not limited in this regard, heat exchanger 106 could be disposed, for example, along the length of the vehicle and further rearward of the front wheel wells of the vehicle, or along the length of the vehicle and the upper surface of the vehicle, or along the length of the vehicle between the rearward end of the vehicle and the rear tires or rear axle of the vehicle. Examples of possible locations and mountings are disclosed more fully in parent application Ser. No. 16/910,680, filed Jun. 24, 2020, the contents of which are incorporated by reference. As such, no further discussion is provided herein. In a non-limiting example, the surface heat exchanger may operate to transfer heat between a working fluid and airflow that is predominantly parallel to a feature of the heat exchanger outer surface. The working fluid may be part of a closed fluid path that exchanges heat with the vehicle component. The feature of the heat exchanger outer surface may be shaped, with fins or the like, to balance heat exchange efficiency with surface drag.

Referring also to FIGS. 4-7, an exemplary embodiment of the surface heat exchanger 106 is shown in greater detail. Heat exchanger 106 is made from aluminum in the exemplary embodiment of the disclosure, but other materials could of course also be used. Heat exchanger 106 includes an upper portion 114 partially defining one or more channels 116 and a lower portion 118 partially defining one or more channels 120. The channels 116 in the upper portion 114 and the channels 120 in the lower portion 118 together define one or more heat transfer fluid passages 122. The upper and lower portions 114, 118 may be secured together by any method including, but not limited to, brazing, welding, soldering, thermal epoxy, mechanical fasteners, or the like, to define the heat transfer fluid passages 122 for the heat transfer fluid or cooling fluid (coolant) to flow through as air passes over the lower portion 118. As shown in the illustrated embodiment, fluid passages 122 form a plurality of serpentine channels guiding the cooling fluid via an inlet 124 to an outlet 126 through the cooling fluid flow circuit (discussed in greater detail below). Alternatively, the cooling channels could also be formed by molding between two molds defining a channel half therein.

When installed on vehicle 100, an inner or interior surface 128 of the heat exchanger 106 will be facing towards the interior of the vehicle and an outer or exterior surface 130 of the heat exchanger 106 will be facing away from the vehicle 100. The outer surface 130 includes a plurality of upstanding, outwardly projecting members or fins 132 which assist in maximizing the air flow surface area over the lower portion 118 of the heat exchanger. In the exemplary embodiment, the plurality of fins 132 define straight, continuous members that are generally parallel to one another and have a predetermined spacing therebetween. Fins 132 may be cast aluminum but other materials and/or manufacturing processes such as extruding and machining could also be used. In order to further reduce the drag, the front or leading edge 134 of the fins 132 may have an angled configuration to guide the air flow A2 across the outer surface 130 in a smooth manner. As discussed above, reducing the drag, including the drag over the heat exchanger 106, thereby increases the aerodynamic performance of the vehicle 100. The rear or trailing edge 136 of the fins 132 may have a square perpendicular edge.

Figure 8:
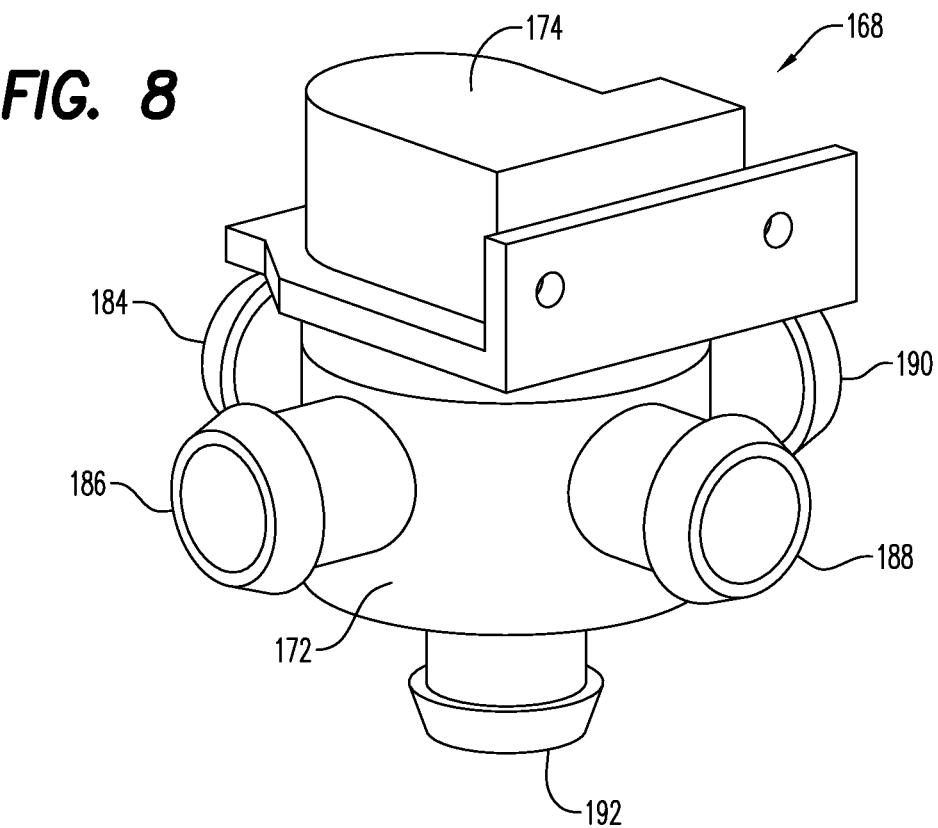
FIG. 8 is a perspective view of an exemplary embodiment of a five-way valve configured for use in a heat transfer system according to the disclosure herein.
Figure 9:
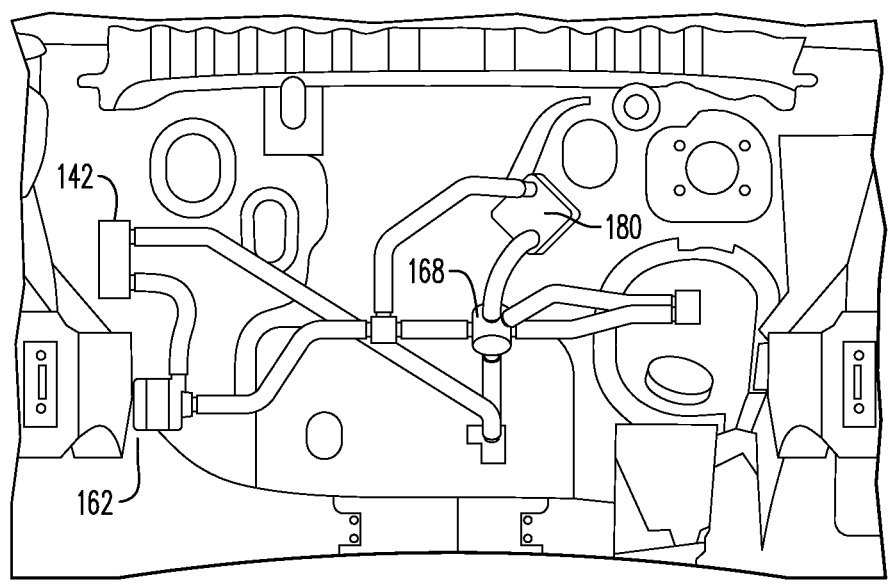
FIG. 9 is a schematic view illustrating the five-way valve installed in a vehicle with a heat transfer system according to the exemplary embodiment of the disclosure.

Referring now to FIG. 8, the thermal management system 170 in accordance with an exemplary embodiment of the disclosure includes a five-way valve as shown generally by reference numeral 168. An actuator 174 is disposed above the valve body 172 and is configured to move a valve seat 176 (see FIG. 10B) so as to control the position of the valve seat 176 and the flow of fluid through the valve 168. The valve 168 include five ports, a first port 184, a second port 186, a third port 188, a fourth port 190 and a fifth port 192 so as to maximize versatility in the thermal management system utilizing a minimal number of components, as shown in FIG. 9. As a result, the thermal management system 170 reduces the overall weight of the required components in addition to providing a cost savings due to the reduction in the number of components. By way of example, the five-way valve 168 allows for the elimination of a 3-way joint, a flow shut valve and two electric water valves from known thermal management systems. Still further, since there are fewer required components to be installed in the given engine space, the thermal management system provides for a better installation of the overall assembly with improved serviceability and layout of surrounding parts.

The thermal management system 170 including the five-way valve 168 is able to control the circulation of the cooling (heat transfer) fluid through alternative flow paths based upon a number of operating conditions, as discussed further below. More particularly, the thermal management system provides four modes of operation: a first mode of operation (see FIG. 10A) in which cooling fluid flows simultaneously through first and second cooling loops whereby the first cooling loop utilizes the heat exchanger or radiator 182 to cool the motors/power control unit 158 and the second cooling loop utilizes a further heat exchanger 180 to heat the high voltage battery 146; a second mode of operation (see FIG. 11A) in which cooling fluid flows simultaneously through first and alternative second cooling loops whereby the first cooling loop utilizes the heat exchanger or radiator 182 to cool the motors/power control unit 158 and the alternative second cooling loop utilizes the chiller 142 to cool the high voltage battery 146; a third mode of operation (see FIG. 12A) in which cooling fluid flows through a third cooling loop encompassing all of the components to be cooled; and a fourth mode of operation (see FIG. 13A) conducive to filling up the coolant level in the closed loop system. As used below, heat exchanger or radiator 182 may refer to a conventional radiator such as primary heat exchanger 104 discussed above, or an underbody heat exchanger 106 as discussed above, or a combined system utilizing a first heat exchanger and a second, surface heat exchanger 104/106 as discussed above, or any other type of heat exchange system for heat transfer from/to one or more vehicle components. Similarly, heat exchanger 180 as used below may encompass any type of heat exchanger or heat transfer system.

Figure 10A:
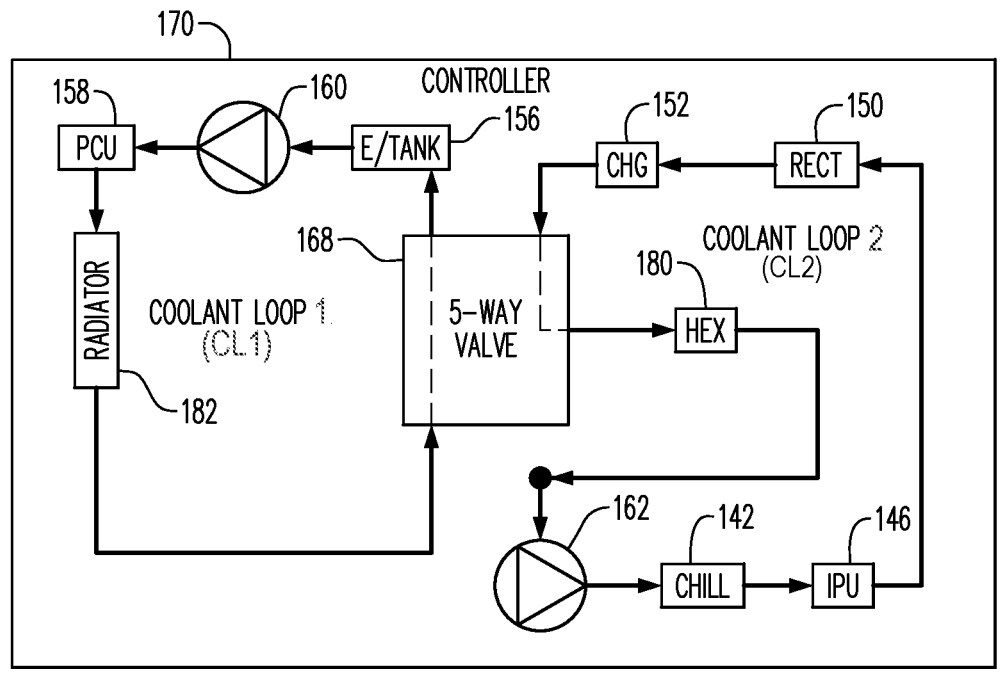
FIG. 10A is a heat transfer system flow diagram according to an exemplary embodiment of the disclosure in a first mode of operation.

In the first mode of operation illustrated in FIG. 10A, five-way valve 168 is configured to direct the cooling/working fluid through a heat exchanger 180 prior to flowing towards the water jacket for the battery 146. The working fluid will be directed to pass through the heat exchanger 180 when the battery is too cold, and thus this mode of operation is also referred to as the battery heating mode such as when the vehicle is first started. The battery 146, unlike the charger 152 and rectifier 150, can require heating at certain times in addition to cooling at certain other times in order to maintain acceptable performance.

Figure 10B:
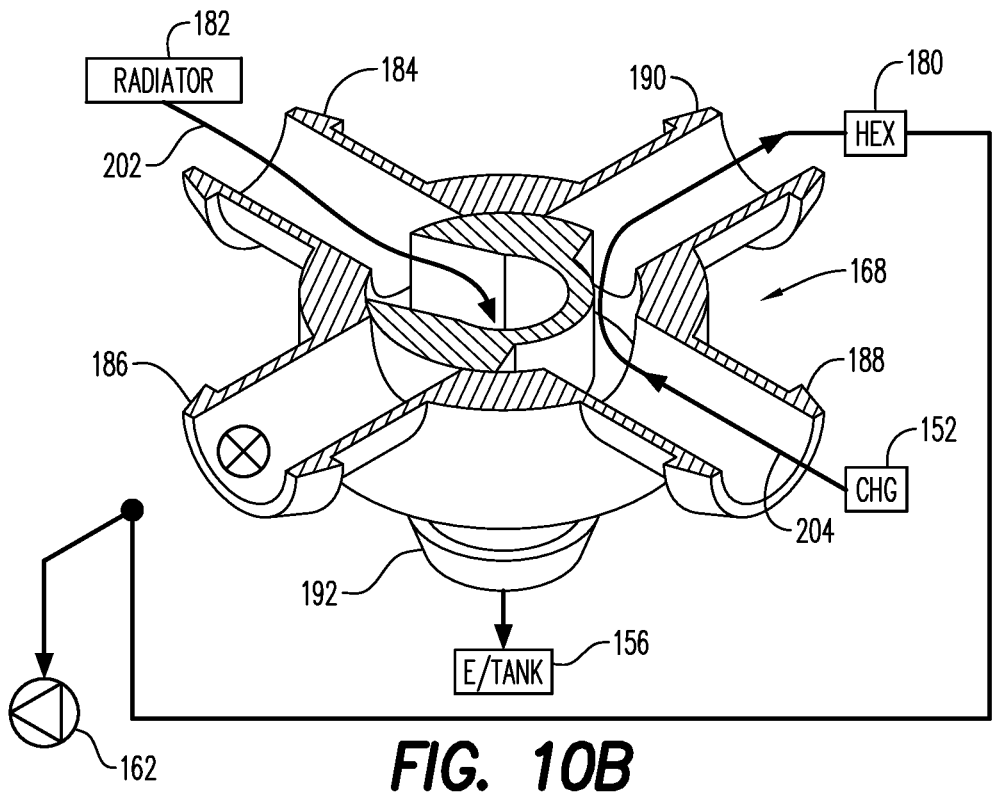
FIG. 10B is a schematic illustration of the five-way valve according to an exemplary embodiment of the disclosure during operation in the first mode of operation.

More particularly, when five-way valve 168 is configured in the first manner of operation, FIG. 10A shows that the cooling fluid is permitted to flow along the first coolant loop CL1 and the second coolant loop CL2. FIG. 10B illustrates a fifth flow path 202 of the heat transfer fluid through the valve 168 flows out of the radiator 182, into the valve 168 through the first port 184, exits the valve 168 through the fifth port 192 and flows into the expansion tank 156. A sixth flow path 204 of the heat transfer fluid through the valve flows from the charger 152, into the valve 168 through the third port 188, exits the valve 168 through the forth port 190 and flows into the further heat exchanger 180. The working fluid then passes through the pump 162 and will be directed to the battery 146. In this first mode of operation, the second port 186 leading directly to the pump 162 is closed.

In the first mode of operation, the cooling fluid passes through the heat exchanger 180 prior to flowing towards the water jacket for the battery 146. That is, the working fluid will be directed to pass through the heat exchanger 180 when the battery is too cold and although the fluid will pass through the chiller 142, the chiller is not activated at the time. In this mode of operation, the working fluid is heated by the heat exchanger 180 in order to raise the temperature of the battery 146. Heat exchanger 180 is broadly defined as any component capable of providing a heat source to the working fluid. In the case of a hybrid vehicle for instance, the heat source could be from the engine. In most all vehicles the heat source could be, by way of example, a resistive heater or a heat pump.

Further components that may be provided in the cooling fluid circuit along the first and second coolant loops CL1 and CL2 include a rectifier 150 and charger 152, as well as an expansion tank 156 and power control unit/motor(s) 158, such as a twin motor unit in the exemplary embodiment. Pumps 160, 162 may also be provided, such as electric fluid pumps for example, to assist with flow of internal working fluid such as coolant or a refrigerant to the motor(s) 158 and battery 146, respectively.

Figure 11A:
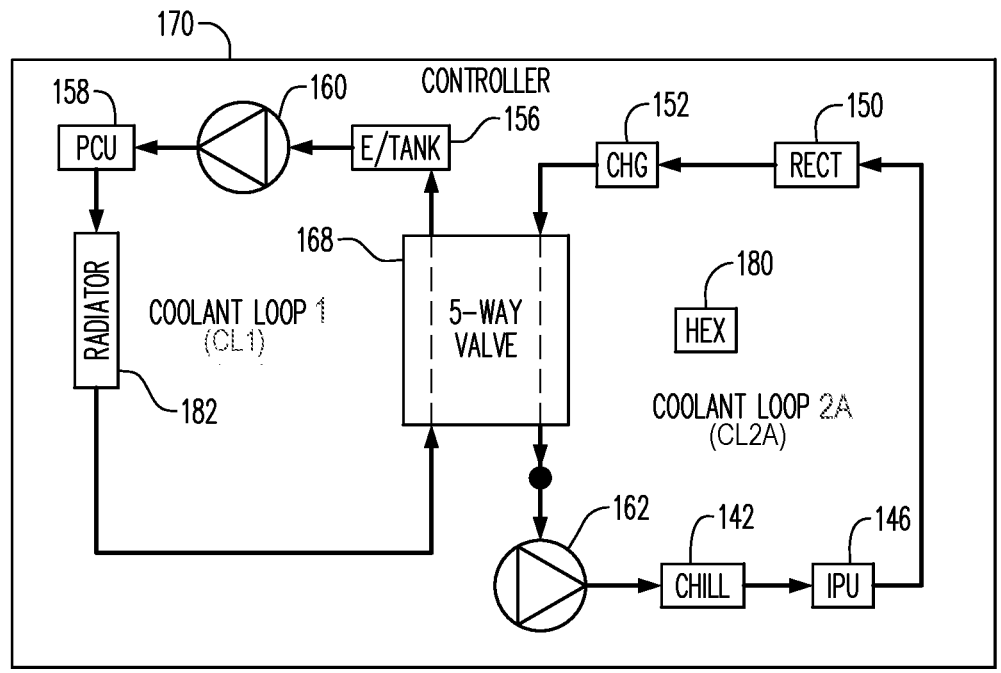
FIG. 11A is a heat transfer system flow diagram according to an exemplary embodiment of the disclosure in a second mode of operation.

In addition to the first mode of operation utilizing the first coolant loop CL1 and second cooling loop shown in FIG. 10A, there are times when cooling instead of heating is required to protect the battery 146 from the risk of extreme temperatures. When such a time is encountered, the five-way valve 168 is adjusted such that cooling fluid flows through both the first coolant loop CL1 and an alternative second coolant loop CL2A, concurrently, as illustrated in FIG. 11A. This represents a second mode of operation according to the exemplary embodiment of the disclosure and is also referred to as a separate mode of operation. The separate mode of operation is the most common mode of operation in electric and hybrid vehicles.

Figure 11B:
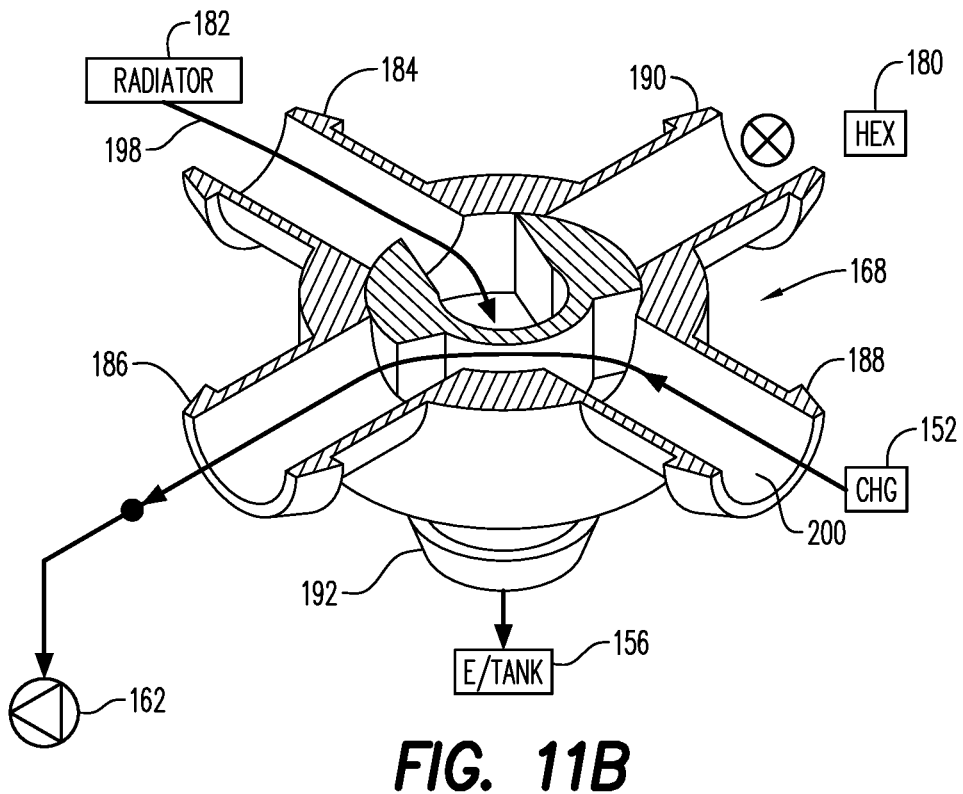
FIG. 11B is a schematic illustration of the five-way valve according to an exemplary embodiment of the disclosure during operation in the second mode of operation.

In the second mode of operation, valve 168 is open for flow of the heat transfer (working) fluid along the first coolant loop CL1 and the alternative second coolant loop CL2A shown in FIG. 11A. More particularly, with reference to FIG. 11B, a third flow path 198 of the heat transfer fluid through the valve 168 flows out of the radiator 182, into the valve 168 through the first port 184, exits the valve 168 through the fifth port 192 and flows into the expansion tank 156. A second flow path 200 of the heat transfer fluid through the valve flows from the charger 152 and into the valve 168 through the third port 188, exits the valve 168 through the second port 186 and flows to the pump 162. In this second mode of operation, the fourth port 190 leading to the further heat exchanger 180 remains closed.

When operating in the second mode of operation, five-way valve 168 directs the cooling fluid passing therethrough such that fluid flows in the first coolant loop CL1 through components such as the expansion tank 156 and motors/power control unit 158 which do not require as much cooling as the battery 146. The cooling fluid will circulate through the heat exchanger 182 and return to the five-way valve 168 in the first coolant loop CL1.

Also while operating in the second mode of operation, the cooling fluid flows in the alternative second coolant loop CL2A, which includes the high voltage battery 146 and other components, such as the rectifier 150 and charger 152. When operating in the second mode of operation, the chiller 142 is normally off, but may be activated when additional cooling performance is needed in order to more quickly cool the cooling fluid and thus provide immediate cooling for the battery 146. The chiller 142 is very effective for rapid cooling of the battery 146 because it uses energy from the air conditioner condenser (not shown) to cool the cooling fluid passing therethrough. However, because of the condenser usage, the chiller is not the most efficient use of energy and it is desirable to minimize the use thereof. Minimization of the use of the chiller 142 is achieved by the thermal management control system 170 operating the heat transfer system through the alternative second coolant loop CL2A and determining an optimum battery temperature and ambient temperature at which to change operation from the second mode of operation to a third mode of operation, as discussed below.

More particularly, in addition to the second mode of operation utilizing the first coolant loop CL1 and alternative second cooling loop CL2A shown in FIG. 11A, there are times when heat exchanger cooling alone is sufficient to protect the battery 146 and the other components of the system.

Figure 12A:
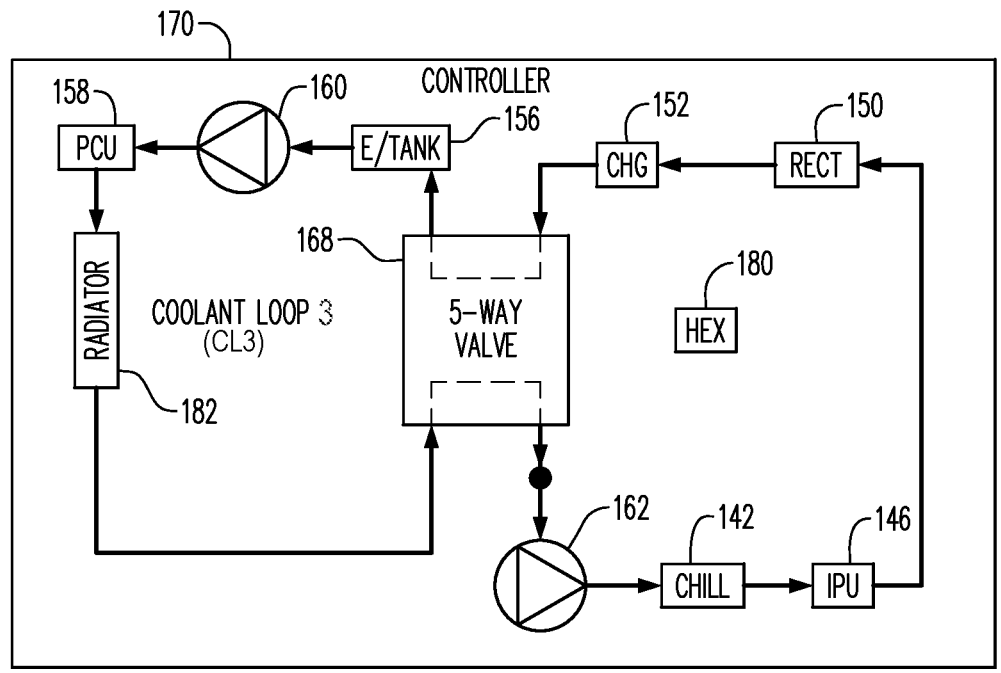
FIG. 12A is a heat transfer system flow diagram according to an exemplary embodiment of the disclosure in a third mode of operation.
Figure 12B:
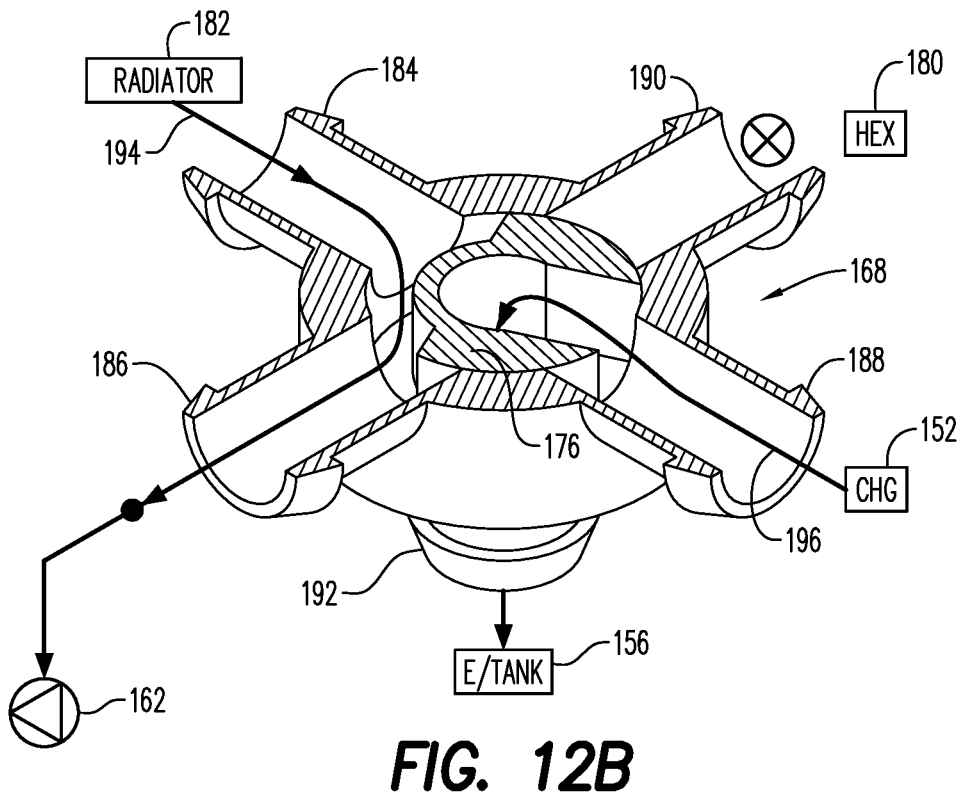
FIG. 12B is a schematic illustration of the five-way valve according to an exemplary embodiment of the disclosure during operation in the third mode of operation.

FIGS. 12A and 12B illustrate a heat transfer fluid flow circuit in a third mode of operation according to an exemplary embodiment of the disclosure herein. More particularly, when five-way valve 168 is configured in a third manner, FIG. 12A shows that the cooling fluid is permitted to flow about the perimeter of a fluid flow circuit to define a single continuous third coolant loop CL3. In this mode of operation, the radiator 182 provides the cooling for all of the system components in series and hence it is also referred to as the radiator mode of operation. In the third mode of operation, valve 168 is open for flow therethrough and the heat transfer (working) fluid flows along the third coolant loop CL3 shown in FIG. 12A. More particularly, a first flow path 194 of the heat transfer fluid through the valve 168 flows out of the radiator 182, into the valve 168 through the first port 184, exits the valve 168 through the second port 186 and flows into the pump 162. A second flow path 196 of the heat transfer fluid through the valve flows from the charger 152, into the valve 168 through the third port 188, exits the valve 168 through the fifth port 192 and flows into the expansion tank 156. In this third mode of operation, the fourth port 190 leading to the further heat exchanger 180 remains closed.

In the third mode of operation, the cooling fluid passes through five-way valve 168 and optionally through a chiller 142 (heat exchanger with air conditioner) which may/may not be operational, and directly to a cooling fluid jacket (not shown) for a high voltage battery 146. Further components may be provided in the cooling fluid circuit along the third coolant loop CL3, such as for example, a rectifier 150 and charger 152, as well as an expansion tank 156 and power control unit/motor(s) 158, such as a twin motor unit in the exemplary embodiment. Pumps 160, 162 may also be provided, such as electric fluid pumps for example, to assist with flow of internal working fluid such as a coolant or a refrigerant to the motor(s) 158 and battery 146, respectively.

Figure 13A:
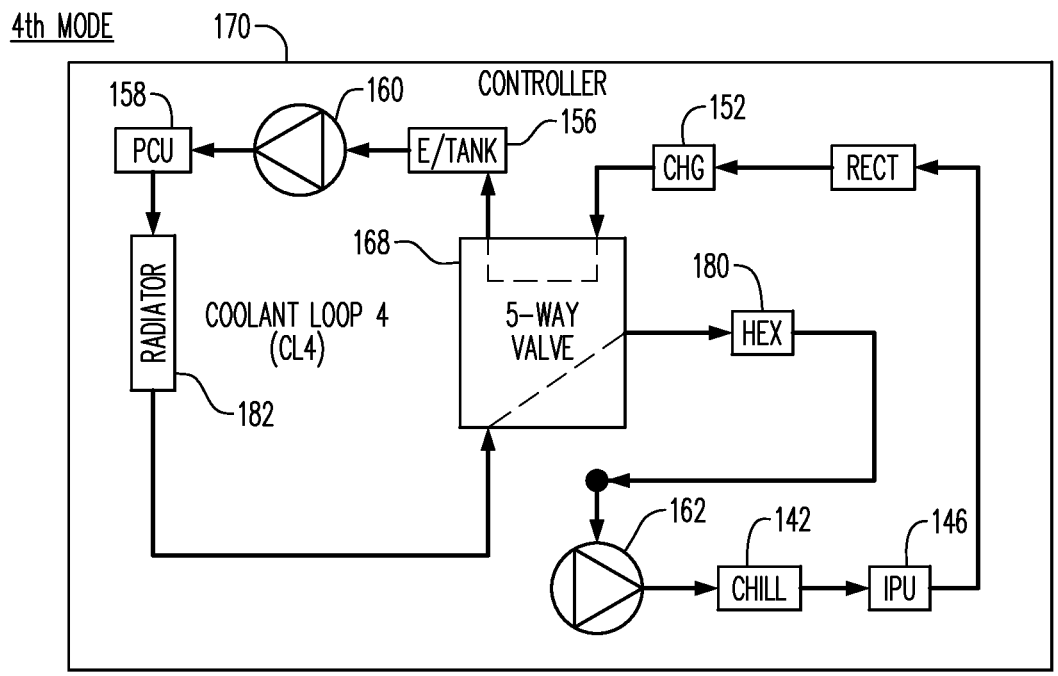
FIG. 13A is a heat transfer system flow diagram according to an exemplary embodiment of the disclosure in a fourth mode of operation.
Figure 13B:
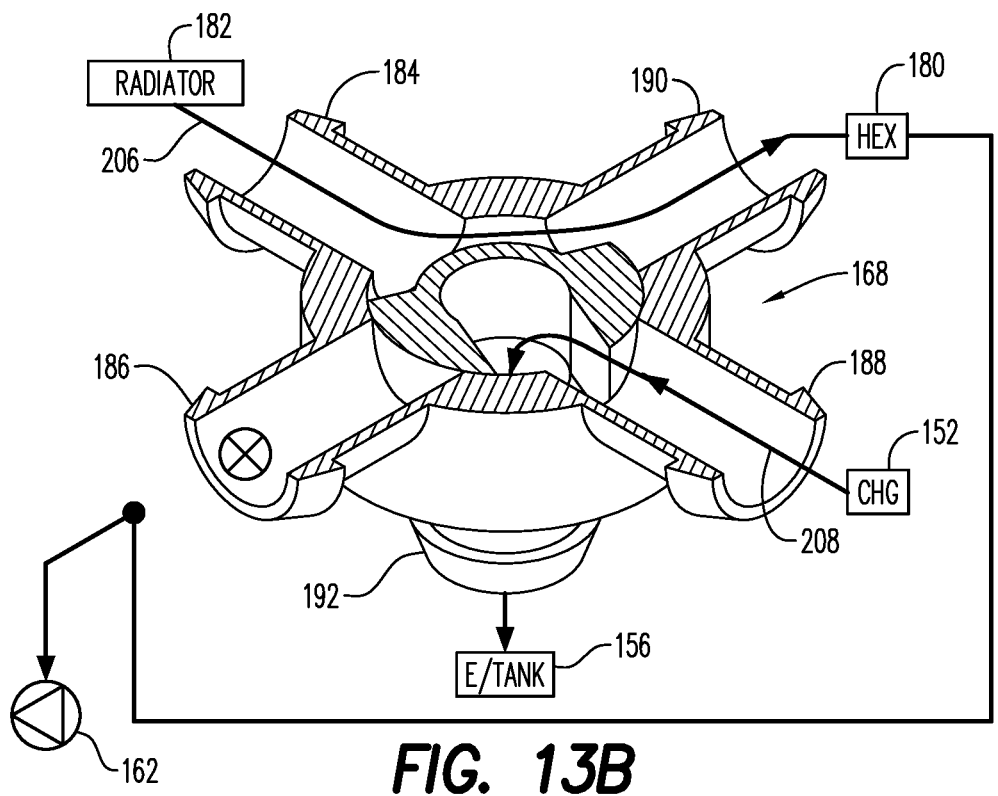
FIG. 13B is a schematic illustration of the five-way valve according to an exemplary embodiment of the disclosure during operation in the fourth mode of operation.

FIGS. 13A and 13B illustrate a heat transfer fluid flow circuit in a fourth mode of operation according to an exemplary embodiment of the disclosure herein. The fourth mode of operation is conducive to filling up the coolant or working fluid within the thermal management system and is also referred to as the coolant fill up mode. The fourth mode of operation would most likely only be used at the factory during installation or at a dealership during service. Depending upon the assembly of components in a particular vehicle, the fourth mode of operation could be deleted.

In an exemplary embodiment of the disclosure, the five-way valve 168 will switch between the first, second and third modes of operation as required to maximize efficiency while maintaining optimum battery temperature. Since battery chemistry varies between batteries, there is no definitive timing or condition dictating when the valve 168 will switch between modes of operation. As a worst case scenario, however, when a vehicle is first started the battery will be cold so the thermal management system 170 will begin operation in the first mode of operation, i.e., the battery heating mode. After a period of time of driving, and depending upon the driving cycle, the valve 168 will change to the separate or second mode of operation where the battery does not require cooling or heating. As driving time continues and the battery continues to heat, the valve 168 will switch to the radiator or third mode of operation so that the battery 146 and all the components can be cooled by the radiator. Thereafter, it may be that the battery 146 requires additional cooling beyond that of the radiator 182. In this instance, the valve 168 will switch again to the second or separate mode of operation but in this scenario the chiller 142 will be activated to more rapidly cool the battery 146.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A heat transfer system for a vehicle comprising:
 a first mode of operation wherein a heat exchanger is configured to cool a first plurality of components of a vehicle in a first fluid flow path, and a battery heat exchanger is configured to heat at least one battery in a second fluid flow path, wherein the first fluid flow path is separate from the second fluid flow path;
 a second mode of operation wherein the heat exchanger is configured to cool the first plurality of components in the first fluid flow path and a chiller is configured to selectively cool a second plurality of components of the vehicle in the second fluid flow path;
 a third mode of operation wherein the heat exchanger is configured to cool both the first plurality of components and the second plurality of components in a third fluid flow path; and
 a controller that is operable to selectively change a mode of operation between the first mode of operation, the second mode of operation and the third mode of operation based on one or more operating conditions of the vehicle.

2. The heat transfer system according to claim 1, wherein the first plurality of components includes at least a motor and power control unit.

3. The heat transfer system according to claim 2, wherein the second plurality of components includes the at least one battery and a charger.

4. The heat transfer system according to claim 3, wherein, in the third mode of operation, the heat exchanger comprises a radiator.

5. The heat transfer system according to claim 4, wherein, in the third mode of operation, the controller is configured to selectively actuate the chiller to cool the at least one battery.

6. The heat transfer system according to claim 5, wherein, in the second mode of operation, the controller is configured to selectively actuate the chiller to cool the at least one battery.

7. The heat transfer system according to claim 6, wherein, in the first mode of operation, the controller is configured to selectively actuate the battery heat exchanger to heat the at least one battery.

8. The heat transfer system according to claim 3, further comprising a five-way valve, the controller actuating the five-way valve to change the mode of operation between the first mode of operation, the second mode of operation and the third mode of operation.

9. The heat transfer system according to claim 1, further comprising a fourth mode of operation wherein a fourth fluid flow path includes the first plurality of components of the vehicle, the second plurality of components of the vehicle, and the battery heat exchanger.

\* \* \* \* \*